(12) United States Patent
Sun et al.

(10) Patent No.: US 11,851,371 B2
(45) Date of Patent: Dec. 26, 2023

(54) BIOMASS WASTE MATERIALS AS A SET-RETARDATION AGENT IN CEMENT OR CONCRETE

(71) Applicant: University of Louisville Research Foundation, Inc., Louisville, KY (US)

(72) Inventors: Zhihui Sun, Louisville, KY (US); Noppadon Sathitsuksanoh, Louisville, KY (US); Chengqing Qi, Overland Park, KS (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 17/387,452

(22) Filed: Jul. 28, 2021

(65) Prior Publication Data

US 2022/0033304 A1 Feb. 3, 2022

Related U.S. Application Data

(60) Provisional application No. 63/058,218, filed on Jul. 29, 2020.

(51) Int. Cl.
| | | |
|---|---|---|
| *C04B 18/24* | (2006.01) | |
| *C04B 28/04* | (2006.01) | |
| *C04B 18/14* | (2006.01) | |
| *C04B 18/02* | (2006.01) | |
| *C04B 28/08* | (2006.01) | |

(52) U.S. Cl.
CPC .......... *C04B 18/248* (2013.01); *C04B 18/021* (2013.01); *C04B 18/146* (2013.01); *C04B 28/04* (2013.01); *C04B 28/08* (2013.01)

(58) Field of Classification Search
CPC ....... C04B 18/08; C04B 18/021; C04B 18/28; C04B 18/141; C04B 18/146; C04B 18/248; C04B 20/023; C04B 28/04; C04B 28/08; C04B 2103/22
See application file for complete search history.

(56) References Cited

U.S. PATENT DOCUMENTS

2020/0079692 A1\* 3/2020 McAlpine ............. C04B 24/383

FOREIGN PATENT DOCUMENTS

| CN | 103483456 A | \* | 1/2014 | |
|---|---|---|---|---|
| CN | 104045281 A | \* | 9/2014 | |
| CN | 108623235 A | \* | 10/2018 | |
| CN | 108947407 A | \* | 12/2018 | |
| CN | 110759685 A | \* | 2/2020 | ............. C04B 28/04 |
| FR | 3026421 A1 | \* | 4/2016 | ............. C04B 14/16 |

OTHER PUBLICATIONS

Hoang et al "Influence of Hemp Retting on the Hydration of Ordinary Portland Cement (OPC) and the Properties of Hemp-OPC Concrete", 3rd International Conference on Bio-Based Building Materials, AJCE—Special Issue vol. 37—Issue 2 (Year: 2019).\*

\* cited by examiner

*Primary Examiner* — Anthony J Green
(74) *Attorney, Agent, or Firm* — WC&F IP

(57) ABSTRACT

A concrete mixture is provided. The mixture includes cement powder, a plant biomaterial in a solid form, wherein the plant biomaterial does not comprise ash, and concrete aggregate, wherein a ratio of cement powder to the biomaterial ranges from 10:1 to 100:1. Methods of controlling concrete setting by adding a plant biomaterial in a solid form to a concrete mixture are also provided.

16 Claims, 10 Drawing Sheets

BIOMASS WASTE MATERIALS AS A SET-RETARDATION AGENT IN CEMENT OR CONCRETE

CROSS REFERENCE TO RELATED APPLICATIONS

This application claims the benefit of U.S. provisional patent application 63/058,218, filed Jul. 29, 2020, the complete contents of which is hereby incorporated by reference.

FIELD OF THE INVENTION

The invention is generally related to plant-based materials, e.g. powders derived from biomass waste, useful as set-retardation agents in cement or concrete applications.

BACKGROUND OF THE INVENTION

The application of plant-based biomass wastes to concrete provides a sustainable way to develop green construction materials. Many researchers have attempted to use different forms of plant-based biomass wastes, such as plant fibers (Chakraborty et al. 2013b; Dewi and Wijaya 2017; Li et al. 2004), plant chips (Guo et al. 2019), and plant powders (Sakr 2006; Tay 1990). Biomass powders (often called "ash"), such as rice husk ash (Habeeb and Mahmud 2010) or corncob ash (Adesanya and Raheem 2009), are often the residue after combustion. They can be used as a replacement of pozzolans in concrete. Research on the direct use of plant-based powders without combustion is limited. Recently, Matos et al. showed that a reasonable partial replacement of cement with cork powders in self-compacting concrete could result in a good strength level and suitable durability (Matos et al. 2015).

Although plant-based powders have the potential to be used in construction materials, several researchers reported the application of plant-based powders can reduce the mechanical properties of concrete (Guerra et al. 2012; Karim et al. 2017). There are some challenges towards its good application. For example, Karim et al. studied the palm oil shell powder blended cement and concluded the partial replacement of cement with palm oil shell powders can increase the setting time of concrete (Karim et al. 2017). Plant-based powders, similar to fibers and chips, are mainly comprised of cellulose, hemicellulose, lignin, and extractives. These organic components can delay cement hydration by forming a protective layer around the partially hydrated cement grains or forming a chelate complex with the cations present in the hydrated cement (Jo and Chakraborty 2015). In addition, it was reported that hemicellulose and lignin are soluble in the alkali solution (John and Anandjiwala 2008; John and Thomas 2008). They can be decomposed when subjected to the alkaline environment of concrete (Wei and Meyer 2014). The decomposition products can also delay the hydration of cement (Bilba et al. 2003; Vaickelionis and Vaickelioniene 2006; Xie et al. 2016). Therefore, in order to mitigate the delay effect of plant-based biomass powders on cement hydration, it's necessary to conduct treatment prior to its application.

Up to now, many treatments have been applied to plant-based biomass wastes, of which alkaline treatment is the most commonly used. It was reported that alkaline treatment can remove the hemicellulose, lignin, pectin, and wax of plants (Lu and Oza 2011; Sawpan et al. 2011). Jo and Chakraborty reported that the mild alkali treatment on jute was demonstrated to reduce the set delay effect on cement hydration compared to untreated jute (Jo and Chakraborty 2015). Quiroga et al. compared three different treatment methods including water extraction, alkaline hydrolysis, and retention of inhibitory substances on wood and concluded that alkaline hydrolysis was the most effective method for minimizing the set delay effect on cement hydration (Quiroga et al. 2016).

Improved biomass materials and treatment methods are needed for application as set-retardation agents in cement or concrete.

SUMMARY

Described herein are set-retardation agents derived from plant biomass wastes in a solid form, such as a powder. The solid form biomaterials provide a denser structure to cement paste and also enhance the toughness of the paste/concrete. Thus, the biomaterials act as multifunctional additives to cement and concrete mixtures.

An aspect of the disclosure provides a concrete mixture comprising cement powder, a plant biomaterial in a solid form, wherein the plant biomaterial does not comprise ash, and concrete aggregate, wherein a ratio of cement powder to the biomaterial ranges from 10:1 to 100:1. In some embodiments, the ratio of cement powder to the plant biomaterial ranges from 10:1 to 25:1. In some embodiments, the plant biomaterial is obtained from a plant selected from the group consisting of hemp, kenaf, and combinations thereof. In some embodiments, the plant biomaterial is obtained from a plant part selected from the group consisting of a stalk, stem, flowering material, hurd, bast, and combinations thereof. In some embodiments, the solid form is selected from the group consisting of powder, chips, fibers, and nanoparticles. In some embodiments, the mixture further comprises one or more materials selected from siliceous or calcareous fly ash, slag cement, and silica fume.

Another aspect of the disclosure provides a method of controlling concrete setting comprising adding a plant biomaterial in a solid form to a concrete mixture. In some embodiments, the plant biomaterial replaces 1 to 10 wt % of cement powder in the concrete mixture. In some embodiments, the plant biomaterial is obtained from a plant selected from the group consisting of hemp, kenaf, and combinations thereof. In some embodiments, the plant biomaterial is obtained from a plant part selected from the group consisting of a stalk, stem, flowering material, hurd, bast, and combinations thereof. In some embodiments, the solid form is selected from the group consisting of powder, chips, fibers, and nanoparticles. In some embodiments, the method further comprises adding one or more materials selected from siliceous or calcareous fly ash, slag cement, and silica fume.

In further embodiments, the plant biomaterial is treated with an alkaline extraction agent prior to being added to the concrete mixture. In some embodiments, the plant biomaterial is washed with water after being treated with the alkaline extraction agent. In some embodiments, at least a portion of the alkaline extraction agent used to treat the plant biomaterial is added to the concrete mixture. In some embodiments, at least a portion of the water used to wash the plant biomaterial is added to the concrete mixture.

DETAILED DESCRIPTION

Figure 1A:
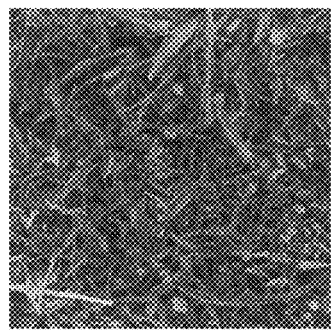
FIGS. 1A-C. Images of (a) hemp leaves; (b) fine hemp powders; and (c) coarse hemp powders.

Embodiments of the disclosure provide biomass-derived materials (e.g. plant powders) that are useful as multifunctional additives for cement and concrete applications. The biomaterials act as set-retardation agents while also enhancing the toughness of the cement paste/concrete. Concrete mixtures disclosed herein may comprise cement powder, a plant biomaterial in a solid form, and concrete aggregate.

A cement is a substance used for construction that sets, hardens, and adheres to other materials to bind them together. For example, cement may be used to bind aggregate (e.g. sand and gravel) together to form concrete. Cements used in construction are usually inorganic, often lime or calcium silicate based. The mixtures of the present disclosure are compatible with any type of hydraulic cement which set and become adhesive due to a chemical reaction between the dry ingredients and water. The chemical reaction results in mineral hydrates that are not very water-soluble and so are quite durable in water and safe from chemical attack. This allows setting in wet conditions or under water and further protects the hardened material from chemical attack. Hydraulic cements are made of a mixture of silicates and oxides. Suitable hydraulic cements include, but are not limited to, Portland cement, Blended Portland cement, pozzolan-lime cement, white cement, oil well cement, calcium aluminate cement, calcium sulfoamuminate cement, polymer modified/impregnated cement, expansive cement, and cements for ultra high performance concrete, etc. Cement powder may comprise 5-50 wt % of the concrete mixture.

Concrete aggregates are an inert filler in a concrete mixture. Exemplary concrete aggregates include, but are not limited to, gravel, sand, recycled concrete, slag, topsoil, ballast, and geosynthetic aggregates. Concrete aggregates may comprise 50-90 wt % of the concrete mixture.

Cement starts to set when mixed with water, which causes a series of hydration chemical reactions. Water generally comprises 10-20 wt % of the mixture, e.g. 14-18 wt %. The constituents slowly hydrate and the mineral hydrates solidify and harden. The interlocking of the hydrates gives cement its strength. Hydraulic cement does not set by drying out. Instead, proper curing requires maintaining the appropriate moisture content necessary for the hydration reactions during the setting and the hardening processes. If hydraulic cements dry out during the curing phase, the resulting product can be insufficiently hydrated and significantly weakened. Suitable temperatures for curing generally range from 5° C. to 30° C. During the curing process, the concrete should be protected against water evaporation due to direct insolation, elevated temperature, low relative humidity, and wind.

The plant biomaterials described herein provide a delaying effect on cement hydration. Thus, they are useful in serving as retardation agents to adjust cement hydration rates, particularly when rapid hydration needs to be avoided. The biomaterials allow for controlling the heat of hydration and may be used in special applications such as oilwell cementing under elevated temperature and pressure, hot weather construction, to stabilize hydration of returned plastic concrete by post-addition of biomass materials, etc.

In some embodiments, a ratio of cement powder to the biomaterial ranges from 10:1 to 1000:1, e.g. 10:1 to 100:1, e.g. 10:1 to 25:1. The plant biomaterial may be obtained from a variety of plants including, but not limited to, hemp (*Cannabis sativa*), kenaf (*Hibiscus cannabinus*), tobacco leaves, agricultural wastes (e.g. wheat straw, rice straw, corn stover, etc.), dedicated crops (e.g. switchgrass, *miscanthus*, etc.), woody biomass (e.g. pine, *eucalyptus*, spruce, etc.), and combinations thereof. In some embodiments, the plant biomaterial is any organic matter/material, e.g. as obtained from recycled papers, yard wastes, or other municipal solid wastes. A dry biomass or a wet biomass with a moisture content between 0-90% can be used. Any part of the plant may be used including, for example, the stalk, stem, flowering material (flowers and leaves), hurd, bast, and combinations thereof. The plant biomaterial is incorporated into the concrete mixture in a solid (i.e. non-liquid) form such as a powder, chips, fibers, and nanomaterials such as nanoparticles and nanocellulose. The plant materials may be waste materials left over after an initial processing, such as cannabidiol (CBD) oil extraction.

To prepare a plant-derived powder, the plant part (e.g. dried flowering materials) may be chopped and blended or ground into a powder. In some embodiments, the powder is then passed through a No. 200 sieve having openings of about 0.074 mm. The powders passing through the sieve (fine powders) or those retained on the sieve (coarse powders) may be utilized in cement mixtures as described herein. Accordingly, the present disclosure provides the direct use of plant-based powders without a previous combustion to form an ash. Since the powder may be on the same size scale of cement powders, it helps refining cement paste to have a denser micro-structure. The plant powders also enhance the toughness of the paste/concrete.

In some embodiments, the plant materials, e.g. in a powder form, are surface treated with an alkaline agent such as an aqueous solution containing calcium hydroxide or sodium hydroxide prior to inclusion in the cement mixture. Optionally, the alkaline treated plant material may be washed with water prior to inclusion in the cement mixture. The alkaline agent and/or the water used to pre-treat/wash the plant material may also be included in the cement mixture.

In some embodiments, the plant material is not pre-treated with an alkaline extraction agent and/or is not pre-washed with water or other solvents.

Cement mixtures as described herein may further comprise one or more additional materials such as concrete additives. For example, the mixture may include siliceous or calcareous fly ash, slag cement, and/or silica fume.

Further embodiments provide a method of controlling concrete setting comprising adding a plant biomaterial in a solid form to a concrete mixture. In some embodiments, the plant biomaterial replaces 1 to 20 wt % of cement powder in the concrete mixture, e.g. 1-15 wt % or 1-10 wt %.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

Example

Summary

In this study, the residual of hemp products as biomass wastes has been ground into powders to be used in cement-based materials. The effect of untreated and alkaline treated hemp powders on the hydration of Portland cement paste was studied by isothermal calorimetry analysis, thermogravimetric analysis, Fourier transform infrared spectroscopy analysis, and scanning electron microscopy analysis. The results show that partially replacing cement with untreated and alkaline treated hemp powders can delay cement hydration and reduce the degree of hydration. Compared to untreated hemp powders, alkaline treated (washed or non-washed) hemp powders show less set delay effect on cement hydration; moreover, distilled water washed treated hemp powders delay less than non-washed treated hemp powders. The study also shows that coarse hemp powders exert a less set delay effect on cement hydration than fine hemp powders. Generally, the distilled water washed treated coarse hemp powders exert the minimum delay effect on cement hydration.

Materials and Methods

Hemp Powder Preparation

Figure 1B:
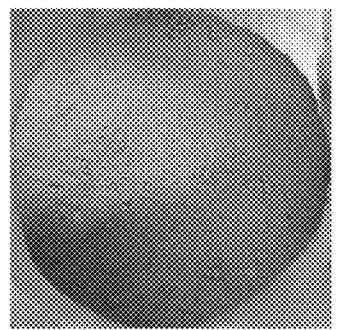
Figure 1C:
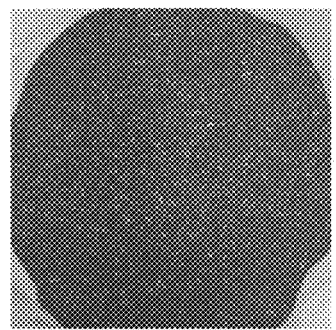

Hemp powders were prepared from flowering materials (flowers and leaves) and used to partially replace cement in this study. These flowering materials were provided by Green Remedy, Inc. (Louisville, KY, USA). Cannabidiol (CBD) was extracted from them prior to hemp powder preparation. To prepare the hemp powders, oven dried flowering materials (shown in FIG. 1(a)) were firstly chopped and blended into powders by using a high-speed blender and then sieved through a No. 200 sieve. The powders passing through the sieve were called fine hemp powders, as shown in FIG. 1(b), and those retained on the sieve were called coarse hemp powders, as shown in FIG. 1(c).

Chemical Treatment

The fine and coarse hemp powders were chemically treated by using the same procedure as introduced below. Saturated calcium hydroxide solution (saturated lime water) was prepared in a beaker at room temperature. Hemp powders were introduced to the prepared solution (hemp-to-solution mass ratio=0.1) and stirred by using an AREX-6 Digital PRO (a kind of hot plate stirrer) (Velp Scientifica, Usmate, Italy) to assure good dispersion. The beaker was then covered to avoid water evaporation. After 24 h, a centrifuge was used to filter out hemp powders from the calcium hydroxide solution. A part of treated hemp powders was collected without washing. The remaining part of the treated hemp powders was further washed by distilled water several times until the pH was close to neutral. The collected wet hemp powders (both washed and non-washed) were dried in an oven for 24 h at 40° C. And finally, the dried hemp powders were ground by using a mortar and pestle to eliminate the clumping. Based on the hemp powder size and treatment method, six types of hemp powders were obtained, as listed in Table 1.

TABLE 1

Classification of hemp powders

| Sample | Specification |
|--------|---------------|
| RU | Untreated hemp powders retained on No. 200 sieve |
| PU | Untreated hemp powders passing through No. 200 sieve |

TABLE 1-continued

Classification of hemp powders

| Sample | Specification |
|---|---|
| RTN | Nonwashed treated hemp powders retained on No. 200 sieve |
| PTN | Nonwashed treated hemp powders passing through No. 200 sieve |
| RTW | Distilled-water-washed treated hemp powders retained on No. 200 sieve |
| PTW | Distilled-water-washed treated hemp powders passing through No. 200 sieve |

Note:
P = passing; R = retained; U = untreated; T = treated; N = nonwashed; and W = washed.

Cement Paste Preparation

The chemical compositions and the mineral clinker compounds of the Type I/II cement used are shown in Table 2 and Table 3 (Shang and Sun 2019). The water/binder ratio was kept at 0.50, and hemp powders were used to replace 5.0% and 10.0% of cement by weight. The corresponding mix proportion is shown in Table 4. The samples are named after the hemp powder type and dosage. For example, RTW10 denotes the paste with 10% of cement replaced by distilled water washed treated hemp powders that were retained on the No. 200 sieve.

TABLE 2

Chemical composition of Type I/II low alkaline (LA) portland cement

| Chemical compound | Weight (%) |
|---|---|
| CaO | 63.30 |
| $SiO_2$ | 19.70 |
| $Al_2O_3$ | 5.00 |
| $Fe_2O_3$ | 3.47 |
| MgO | 3.59 |
| $SO_3$ | 2.50 |
| $Na_2O$ | 1.55 |
| $K_2O$ | 0.45 |
| Loss on Ignition | 0.54 |

TABLE 3

Major compounds of Type I/II LA portland cement

| Clinker phase | Weight (%) |
|---|---|
| $C_3S$ | 59.32 |
| $C_2S$ | 11.81 |
| $C_3A$ | 7.39 |
| $C_4AF$ | 10.55 |

TABLE 4

Mix proportions of cement paste

| Sample | Water | Cement (Type I/II) | Hemp powder | Specification |
|---|---|---|---|---|
| Control | 0.5 | 1 | 0 | Cement paste with no hemp powders |
| PU5 | 0.5 | 0.95 | 0.05 | Cement paste with 5% PU |
| RTN5 | 0.5 | 0.95 | 0.05 | Cement paste with 5% RTN |
| PTN5 | 0.5 | 0.95 | 0.05 | Cement paste with 5% PTN |
| RTW5 | 0.5 | 0.95 | 0.05 | Cement paste with 5% RTW |
| PTW5 | 0.5 | 0.95 | 0.05 | Cement paste with 5% PTW |
| PU10 | 0.5 | 0.90 | 0.10 | Cement paste with 10% PU |
| RTN10 | 0.5 | 0.90 | 0.10 | Cement paste with 10% RTN |
| PTN10 | 0.5 | 0.90 | 0.10 | Cement paste with 10% PTN |
| RTW10 | 0.5 | 0.90 | 0.10 | Cement paste with 10% RTW |
| PTW10 | 0.5 | 0.90 | 0.10 | Cement paste with 10% PTW |

Note:
P = passing; R = retained; U = untreated; T = treated; N = nonwashed; W = washed; 5 = 5%; and 10 = 10%.

Isothermal Calorimetry Test

In order to evaluate the hydration of cement, Isothermal calorimetry (IC) test was conducted on cement paste according to ASTM C1702 (ASTM. 2009). TAM Air (TA Instruments, New Castle, Delaware), a commercial calorimeter, was adopted in this study (Sun et al. 2017). It is an eight-channel isothermal heat conduction calorimeter with an operating temperature range of 5-60° C. Before the testing, the equipment was carefully calibrated based on the calibration procedures specified by the manufacturer's manual. The energy change during hydration was collected and registered by an automated data-acquisition program. The energy value was calculated based on the unit weight of cementitious materials' mass.

Thermogravimetric Analysis

Thermogravimetric analysis (TGA) was conducted on each type of hemp powders under nitrogen atmosphere with a flow rate of 40 ml/min from 25° C. to 600° C., with a heating rate of 10° C./min. Around 10 mg of hemp powders were used for each run. The purpose of this step was to study the decomposition of hemp powders within the temperature range and thus evaluate the effectiveness of calcium hydroxide treatment on the removal of hemicellulose.

TGA was also conducted on 7-day paste mixtures under nitrogen atmosphere, with a flow rate of 40 ml/min from 25° C. to 1100° C. The temperature profile includes increasing from room temperature to 105° C. by 20° C./min and then keeping the temperature at 105° C. for 12 h to remove the evaporable water in the sample. Subsequently, the sample was heated from 105° C. to 1100° C. by 20° C./min, and then the temperature was kept at 1100° C. for 6 h to extract all chemically bound water (CBW). Around 20 mg paste sample was used for each run. The TGA tests were also conducted on pure cement powder and each type of hemp powders by adopting the same test procedure in order to correct the weight loss between 105° C. and 1100° C. for chemically bound water calculation.

For cement paste without hemp powders, the calculation of chemically bound water (CBW) is regularly defined as the weight loss of the tested cement paste between 105° C. and 1100° C., corrected for the loss on ignition (LOI) of the dry cement powder itself (Cao et al. 2015; Feng et al. 2004). However, for cement pastes with hemp powders, the calculation of chemically bound water is more complicated and needs to be additionally corrected to take account for the decomposition of hemp powders involved.

Fourier Transform Infrared Spectroscopy Analysis

Fourier transform infrared spectroscopy (FTIR) test was conducted on pure cement powder and 7-day cement pastes by using a PerkinElmer Spectrum 100® series spectrometer (Shelton, Connecticut). The sampling technique of Attenuated Total Reflection (ATR) was adopted to enable samples to be examined directly without further preparation (Elmer 2005). The background spectrum was collected at ambient atmosphere, and then the samples were directly analyzed. The spectra were recorded in the range of 650-4000 $cm^{-1}$ with the resolution of 4 cm$^{-1}$ (Horgnies et al. 2013). The purpose of the FTIR test is to evaluate the effect of hemp powders on cement hydration qualitatively by observing the change of functional groups of cement pastes.

Scanning Electron Microscopy Analysis

Scanning electron microscopy (SEM) analysis was conducted on the powdered cement pastes using NOVA NANO-SEM 600™ provided by FBI (Hillsboro, Oregon). Before testing, in order to suppress charging effect, gold sputtering was applied to the surface of specimens. While testing, the Everhart Thornley detector (ETD) in the secondary electron mode was adopted. The beam current and voltage were 0.32 nA and 10 kV, respectively. The purpose of SEM analysis is to observe the microstructure of cement pastes with hemp powders and then identify the effect of hemp powders on cement hydration.

Degree of Hydration Calculation Procedure Based on TGA Correction for Chemically Bound Water Calculation TGA test was conducted on pure cement powder and on each type of hemp powder and paste mixture according to the procedure introduced above. The weights of pure cement powder at 105° C. and 1100° C. are denoted as $C_1$ and $C_2$, respectively. The weights of hemp powders at 105° C. and 1100° C. are denoted as $H_1$ and $H_2$, respectively. The weights of cement paste mixtures at 105° C. and 1100° C. are denoted as $W_1$ and $W_2$, respectively. The loss on ignition of pure cement powder between 105° C. and 1100° C. is $(C_1-C_2)/C_1$, denoted as $L_c$. The weight loss percentage of hemp powders between 105° C. and 1100° C. is $(H_1-H_2)/H_1$, denoted as $L_h$. The weight loss of the tested cement paste between 105° C. and 1100° C. is calculated as shown in eq. (1).

$$W_t = W_1 - W_2 \quad (1)$$

where $W_1$ is the weight of cement paste at 105° C.; $W_2$ is the weight of cement paste at 1100° C.

The weight loss of cement paste between 105° C. and 1100° C. ($W_t$) includes several main parts: (1) decomposition of chemically bound water; (2) loss on ignition of cement powder used; (3) decomposition of hemp powders if involved; and (4) calcium carbonate decomposition. Therefore, to calculate chemically bound water, $W_t$ needs to be modified. It should be noted that the calcium carbonate decomposition correction is not considered because it is hard to be exactly quantified in this study. Therefore, the calculated degree of hydration should be a little bit higher than its real value, but it does not affect the comparative analysis of all samples. Other steps for weight correction of $W_t$ are shown as follows:

(1) Hemp Powder Decomposition Correction ($W_h$)

For cement paste with hemp powders, $W_t$ needs to be modified by considering the decomposition of hemp powders. Assuming the total weight of hemp powders used in cement paste is $H_t$. Based on the weight loss percentage of hemp powders between 105° C. and 1100° C., $L_h$, the remaining weight of hemp powders incorporated into cement paste will be $(1-L_h) \times H_t$ when cement paste is heated to 1100° C. Because the weight of cement paste at 1100° C. is $W_2$, the weight of ignited cement will be $W_2-(1-L_h) \times H_t$ by excluding the remaining hemp powders. Based on the loss on ignition of pure cement powder, $L_c$, the total weight of cement powder used will be deduced as $[W_2-(1-L_h) \times H_t]/(1-L_a)$. If the replacement percentage of cement powder with hemp powders is denoted as r, then the total weight of hemp powders used will be $[W_2-(1-L_h) \times H_t]/[(1-L_c) \times (1-r)]$. Finally, an equilibrium can be achieved as shown in eq. (2), by which $H_t$ can be solved (shown in eq. (3)). The total weight of cement powder used can be calculated by substituting $H_t$ into $[W_2-(1-L_h) \times H_t]/(1-L_a)$, as shown in eq. (4), which is denoted as $C_t$. If no hemp powders are used in cement paste, the replacement content r is 0, then $C_t$ will be simplified into $W_2/(1-L_c)$.

$$\frac{[W_2 - (1-L_h) \times H_t] \times r}{(1-L_c) \times (1-r)} = H_t \quad (2)$$

$$H_t = \frac{W_2 \times r}{(1-L_h) \times r + (1-L_c) \times (1-r)} \quad (3)$$

$$C_t = \frac{W_2 \times (1-r)}{(1-L_h) \times r + (1-L_c) \times (1-r)} \quad (4)$$

where $H_t$ is the total weight of hemp powders used in cement paste; $C_t$ is the total weight of cement powder used in cement paste; $W_2$ is the weight of cement paste at 1100° C.; r is the replacement percentage of cement powder with hemp powders; $L_h$ is the weight loss percentage of hemp powders between 105° C. and 1100° C.; $L_c$ is the loss on ignition of pure cement powder (between 105° C. and 1100° C.).

Based on the total weight of hemp powders used in cement paste, $H_t$, and the weight loss percentage of hemp powders between 105° C. and 1100° C., $L_h$, the weight loss of hemp powders used in cement paste between 105° C. and 1100° C. can be obtained as shown in eq. (5), denoted as $W_h$. $W_h$ is hemp powder decomposition correction content, which will be subtracted from $W_t$ for calculating chemically bound water if hemp powders involved.

$$W_h = H_t \times L_h \quad (5)$$

where $W_h$ is the weight loss of hemp powders used in cement paste between 105° C. and 1100° C.; $H_t$ is the total weight of hemp powders used in cement paste; $L_h$ is the weight loss percentage of hemp powders between 105° C. and 1100° C.

(2) Loss on Ignition Correction ($W_l$)

Based on the loss on ignition of pure cement powder, $L_c$, the weight loss of cement powder used between 105° C. and 1100° C. will be $C_t \times L_c$ as shown in eq. (6), denoted as $W_l$. $W_l$ is the loss on ignition correction content, which will be subtracted from $W_t$ for calculating chemically bound water.

$$W_l = C_t \times L_c \quad (6)$$

where $W_l$ is the weight loss of cement powder used between 105° C. and 1100° C.; $C_t$ is the total weight of cement powder used in cement paste; $L_c$ is the loss on ignition of pure cement powder.

Figure 10:
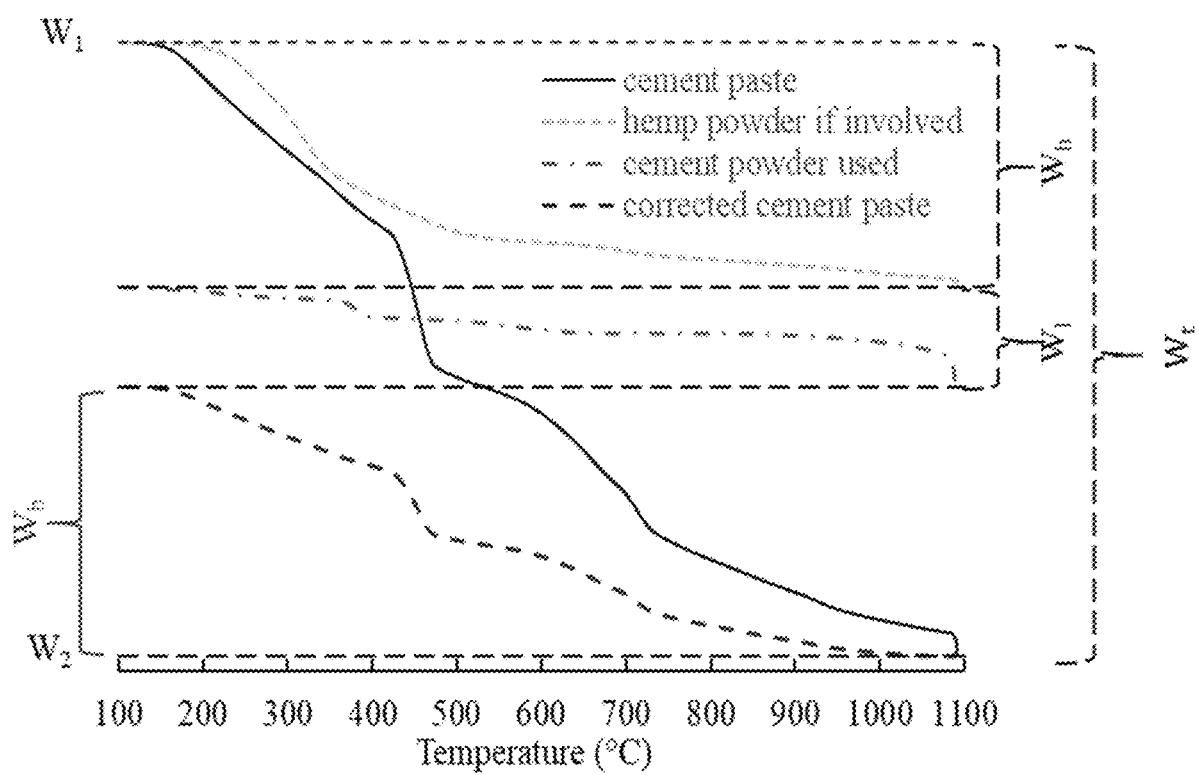
FIG. 10. Schematic of weight-loss correction of cement paste.

With the abovementioned correction, the chemically bound water ($w_b$) of cement paste with hemp powders can be calculated by using eq. (7). FIG. 10 also schematically plots the correction procedure of weight loss of cement paste.

$$W_b = W_t - W_l - W_h \quad (7)$$

where $W_t$ is the total weight loss of cement paste between 105° C. and 1100° C.; $W_1$ is loss on ignition correction, namely the weight loss of cement powder used between 105° C. and 1100° C.; $W_h$ is hemp powder decomposition correction, namely the weight loss of hemp powders used between 105° C. and 1100° C.

Degree of Hydration Calculation

For cement paste with hemp powders, the weight of ignited cement is corrected to be $W_2-(1-L_h) \times H_t$ that has been introduced in "Hemp powder decomposition correction" section. The chemically bound water per unit gram of ignited cement then can be calculated by using $W_b/[W_2-(1-L_h)\times H_t]$, denoted as $W_{bg}$. By substituting $H_t$ obtained in eq. (3) into $W_b/[W_2-(1-L_h)\times H_t]$, $W_{bg}$ can be obtained as shown in eq. (8). If no hemp powders are used in the paste mixtures, the replacement content r is 0, and then $W_{bg}$ will be simplified into $W_b/W_2$.

$$W_{bg} = \frac{W_b \times [(1-L_h)\times r + (1-L_c)\times(1-r)]}{W_2 \times (1-r)\times(1-L_C)} \quad (8)$$

where $W_{bg}$ is the chemically bound water per unit gram of ignited cement; $W_b$ is the chemically bound water of cement paste; $W_2$ is the weight of cement paste at 1100° C.; r is the replacement percentage of cement powder with hemp powders; $L_h$ is the weight loss percentage of hemp powders between 105° C. and 1100° C.; $L_c$ is the loss on ignition of pure cement powder (between 105° C. and 1100° C.).

For completely hydrated Type I Portland cement, the chemically bound water per unit gram of ignited cement ranges from 0.23-0.25 (Pane and Hansen 2005). In this study, 0.25 is adopted. Therefore, the degree of hydration (DoH) can be calculated by using $W_{bg}$ divided by 0.25, as shown in eq. (9). If no hemp powders are used in paste mixtures, the replacement content r is 0, and then DoH will be simplified into $W_b/(0.25\times W_2)$.

$$DoH = \frac{W_b \times ((1-L_h)\times r + (1-L_c)\times(1-r))}{0.25 \times W_2 \times (1-r)\times(1-L_c)} \quad (9)$$

where DoH is degree of hydration of cement paste; $W_b$ is the chemically bound water of cement paste; $W_2$ is the weight of cement paste at 1100° C.; r is the replacement percentage of cement powder with hemp powders; $L_h$ is the weight loss percentage of hemp powders between 105° C. and 1100° C.; $L_c$ is the loss on ignition of pure cement powder (between 105° C. and 1100° C.).

Results and Discussion

Thermogravimetric Analysis on Hemp Powders

Figure 2A:
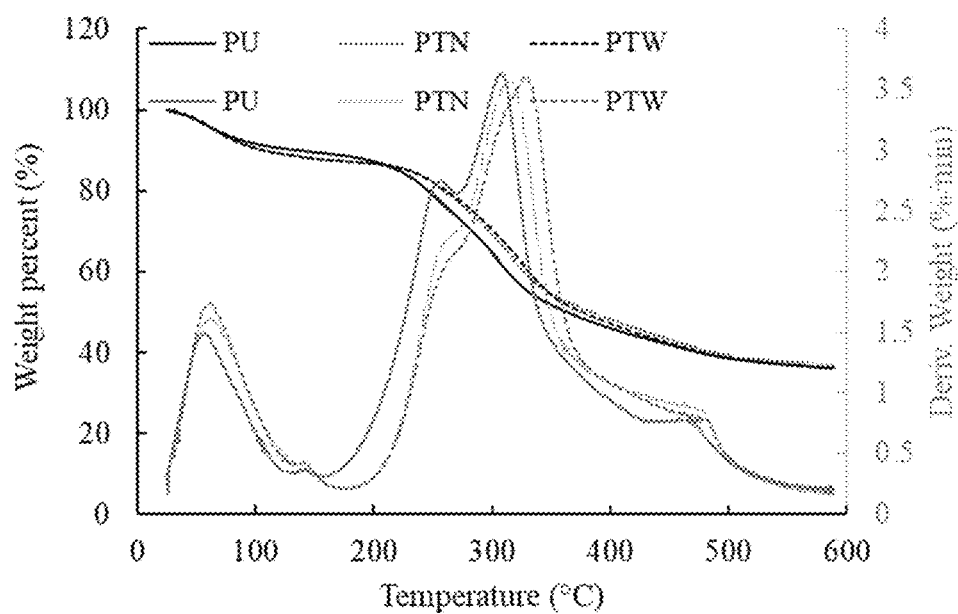
FIGS. 2A-B. TGA and DTGA curves of (a) fine; and (b) coarse hemp powders.
Figure 2B:
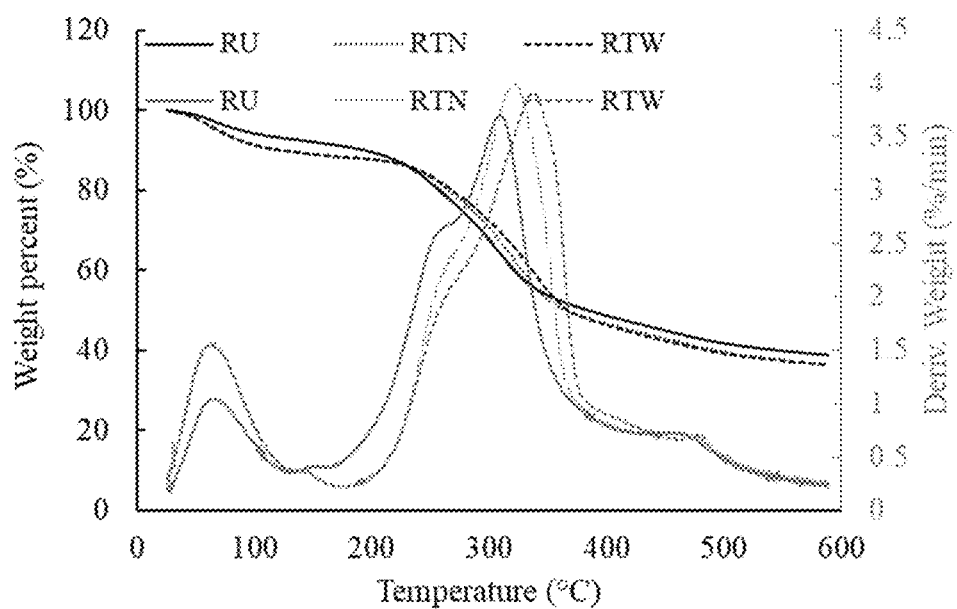

The TGA test has been applied to various types of hemp powders as listed in Table 1. The TGA results on fine hemp powders (PU, PTN, and PTW) and coarse hemp powders (RU, RTN, RTW) are shown in FIG. 2(a) and FIG. 2(b), respectively. For each figure, the weight loss and the weight loss rate (denoted as derivative weight (%/min)) are plotted.

In both figures, it can be seen that there is a large weight loss between 200 and 300° C., which is indicative of high hemicellulose content (Lv et al. 2010; Yang et al. 2007). Even a clear shoulder peak at 200-300° C. exists in DTGA curves for both figures, which is mainly attributed to the decomposition of hemicellulose (Wang et al. 2016). Between 200 and 300° C., the weight losses of PU, PTN, and PTW are 22.53%, 17.35%, and 16.04%, respectively, and the weight losses of RU, RTN and RTW are 21.87%, 17.00% and 15.18%, respectively, as shown in Table 5. Compared to untreated hemp powders, for chemically treated hemp powders, the hemicellulose content decreases, and also the shoulder peaks in DTGA curves become less obvious. In addition, both PTW and RTW have much smoother DTGA curves at 200-300° C. than PTN and RTN. It can be attributed to the washing process after the chemical treatment that further removes hemicellulose. The weight loss of fine hemp powders is slightly more than that of the coarse hemp powders, which may be because fine hemp powders with the larger specific surface area are much easier to be decomposed than coarse hemp powders.

From both figures, a significant peak can be seen between 300 and 400° C. on the derivative weight curve, which is mainly due to the decomposition of cellulose (Yang et al. 2007). In this temperature range, the weight losses of PU, PTN, and PTW are 18.68%, 21.12% and 23.40%, respectively, and the weight losses of RU, RTN and RTW are 19.03%, 23.92% and 26.25%, respectively, as shown in Table 5. It can be seen that the weight loss of cellulose correlates to the weight loss of hemicellulose. That is because chemical treatment and washing process remove some hemicellulose, resulting in the increased relative content of cellulose. Bilba et al. reported that hemicellulose could be decomposed into saccharides in an alkali medium that can have a negative impact on cement hydration (Bilba et al. 2003). The TGA results indicate that the chemical treatment and the further washing process can assist the removal of hemicellulose, which is helpful to minimize the set delay effect of the hemp powders. By comparison of the weight losses, it is expected that the descending order of set delay effect is PU, PTN, and PTW for fine hemp powders, and RU, RTN, and RTW for coarse hemp powders. In addition, the set delay effect on the hydration of RU, RTN, and RTW is expected to be less than that of PU, PTN, and PTW, respectively, due to the smaller specific surface area.

TABLE 5

Weight loss ($W_L$) of all types of hemp powders

| Sample | $W_L$ (%) | |
|---|---|---|
| | 200-300° C. | 300-400° C. |
| PU | 22.53 | 18.68 |
| PTN | 17.35 | 21.12 |
| PTW | 16.04 | 23.40 |
| RU | 21.87 | 19.03 |
| RTN | 17.00 | 23.92 |
| RTW | 15.18 | 26.25 |

Isothermal Calorimetry and Thermogravimetric Analysis on Cement Pastes

Figure 3A:
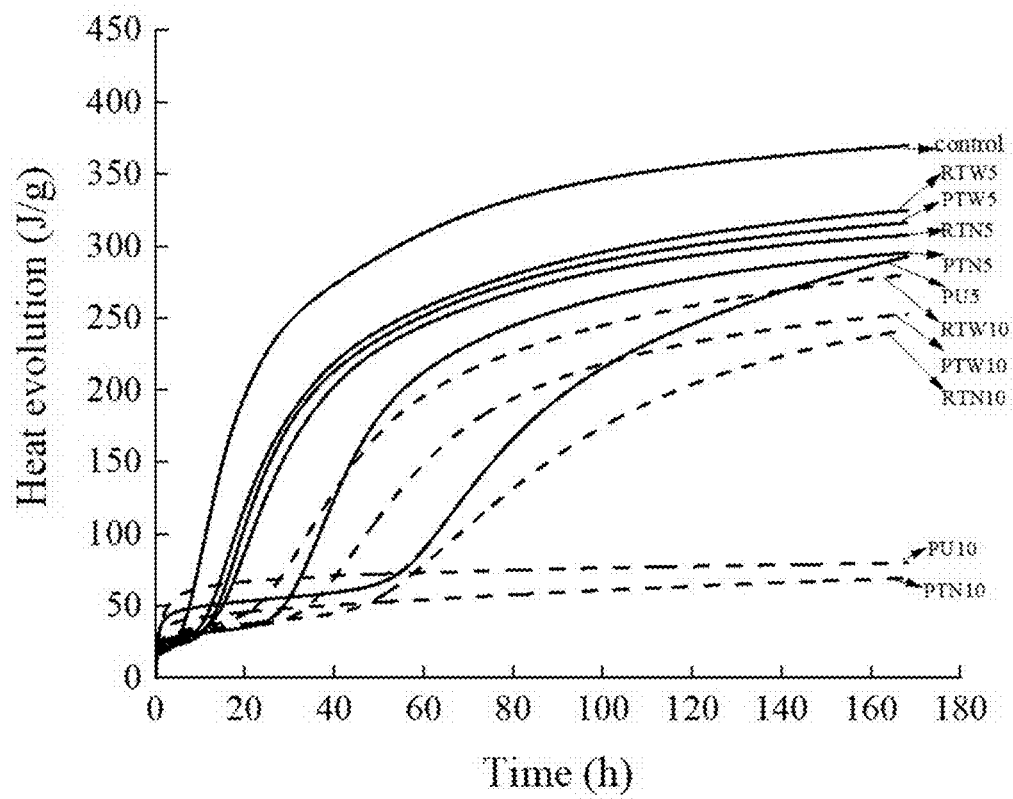
FIGS. 3A-B. (a) Heat evolution; and (b) heat evolution rate during hydration of portland cement paste without and with hemp powders.
Figure 3B:
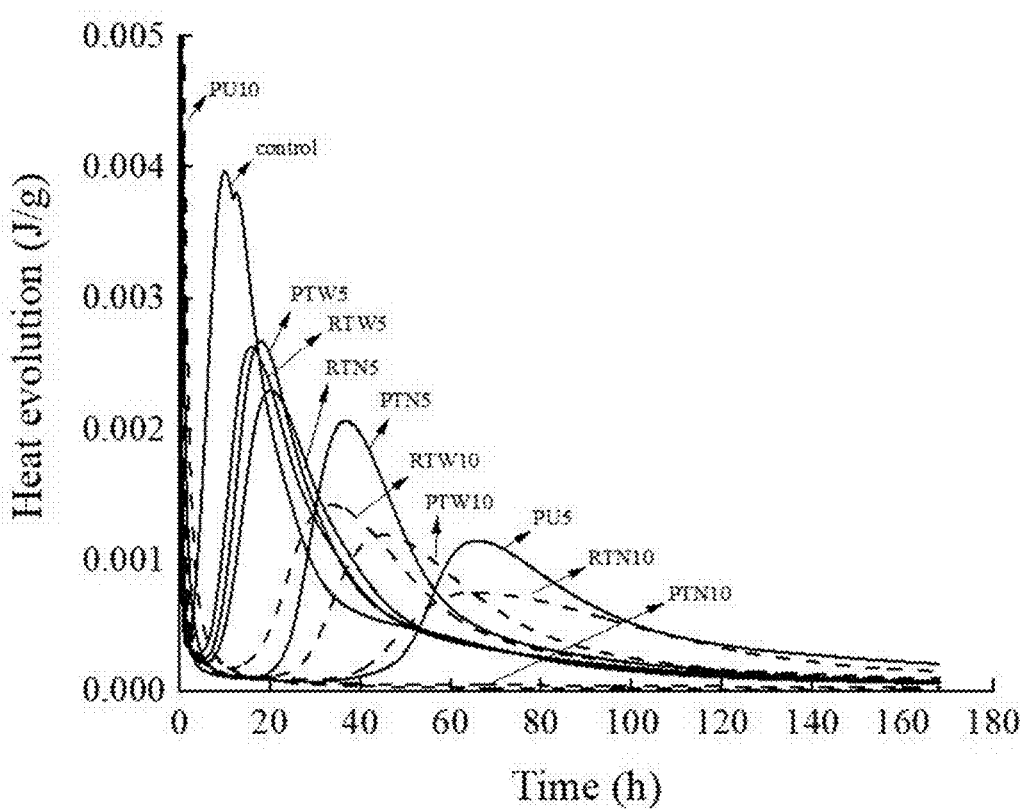

Based on the calorimetric analysis, the heat evolution and heat evolution rate during hydration of Portland cement pastes without and with hemp powders are shown in FIG. 3(a) and FIG. 3(b), respectively. The hydration time corresponding to the peaks in FIG. 3(b) is listed in Table 6. The degree of hydration (DoH) of 7-day cement paste is calculated as summarized in FIG. 4.

From FIG. 3(b), two peaks next to each other (corresponding to $C_3S$ (the $1^{st}$ peak from the left side) and $C_3A$ hydration (the $2^{nd}$ peak), respectively) of the control sample can be clearly seen; however, for any other sample, the second peak disappears, showing the $C_3A$ hydration and ettringite conversion are much affected. This may be because saccharides from hemp powders prevent the formation of ettringite. It has been reported that saccharides influence the morphological evolution of hydrating aluminate particles, such as $C_3A$ (Smith et al. 2011). Moreover, the microstructure analysis introduced in this study shows the formation of needle-like ettringites is much influenced by hemp powders.

Figure 4:
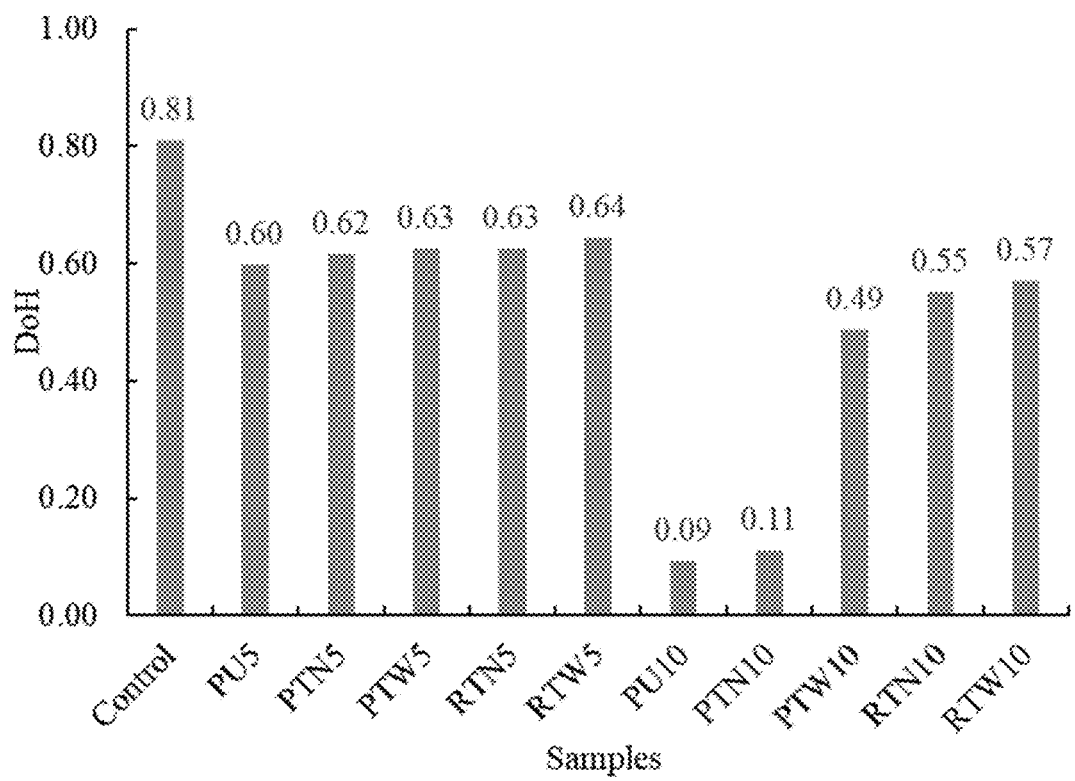
FIG. 4. Degree of hydration of 7-day cement paste samples.

Compared to the control, FIG. 3(a) and FIG. 3(b) show that the heat evolution and heat evolution rate of other samples with hemp powders are all reduced, and Table 6 shows that the hydration time corresponding to the maximum peak of heat evolution rate curve increases (except for PU10 and PTN10). That indicates the addition of hemp powders in cement delays the hydration, which is supported by the reduced degree of hydration (DoH) at 7 days as shown in FIG. 4. For PU10 and PTN10, the heat evolution amount (FIG. 3(a)) is very low, and no peaks exist in their heat evolution rate curve (FIG. 3(b)). The calculated DoH values shown in FIG. 4 are very small. When 10% of the cement powder is replaced, the delay effect of hemp powders is so significant that the dormant period of the samples is very much extended.

The delay effect of hemp powders on cement hydration could be mainly due to the fact that some saccharides are possibly leached out (Vaickelionis and Vaickelioniene 2006). The delaying mechanism of saccharides for cement hydration has not been identified clearly, however, some possible reasons are proposed. One reason is that saccharides can form a complex with the metal ions present in the cement through chelation (Chakraborty et al. 2013a). A protective layer around the partially reacted cement grain is formed to prevent further hydration of cement, which can delay the nucleation and the growth of the hydrated products (Jo and Chakraborty 2015). The second reason may be that some saccharides are unstable in cement paste and can be degraded into some sugar acids, which can inhibit cement hydration (Kochova et al. 2017). The third possible reason can be that organic retarders have strong calcium binding capacity that can prevent the formation of calcium-silicate-hydrate (C-S-H) (Kochova et al. 2017).

TABLE 6

Hydration time corresponding to peaks of heat evolution rate curves

| Sample | Peak 1 (h) | Peak 2 (h) |
|---|---|---|
| Control | 9.91 | 12.45 |
| PU5 | 65.72 | — |
| RTN5 | 20.01 | — |
| PTN5 | 36.64 | — |
| RTW5 | 15.74 | — |
| PTW5 | 18.01 | — |
| PU10 | — | — |
| RTN10 | 65.15 | — |
| PTN10 | — | — |
| RTW10 | 33.56 | — |
| PTW10 | 45.37 | — |

Note:
M-dashes indicate no peak

The Effect of Replacement Content on Cement Hydration

Figure 5A:
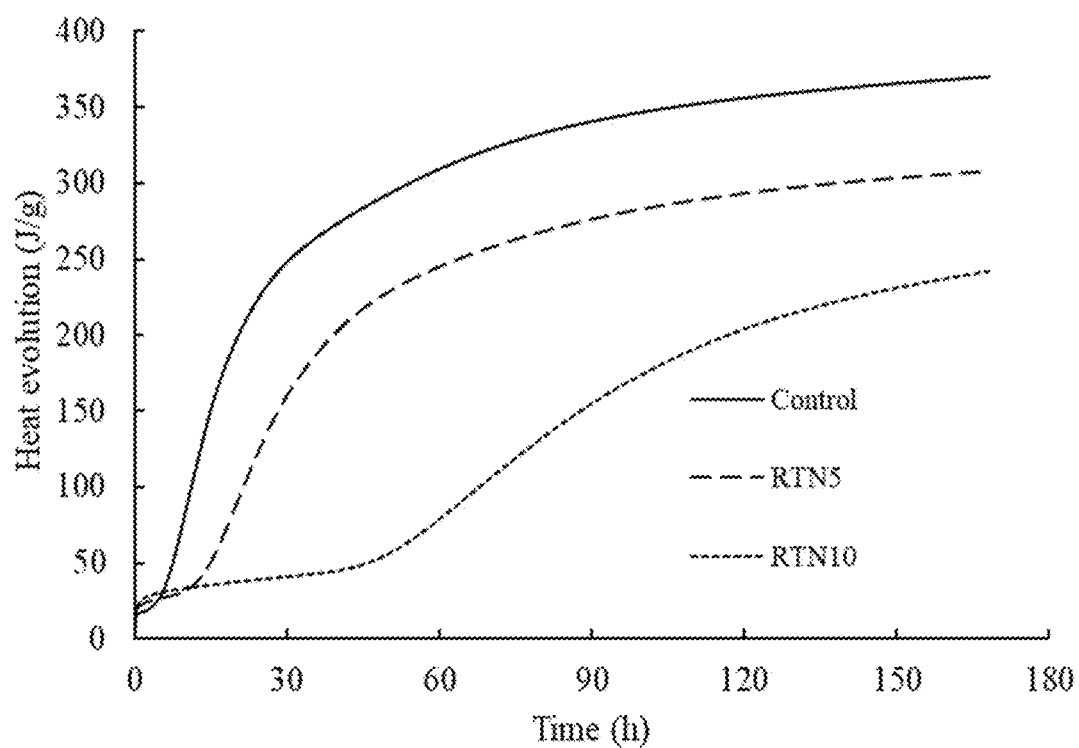
FIGS. 5A-B. (a) Heat evolution; and (b) heat evolution rate during hydration of RTN-incorporated cement paste.
Figure 5B:
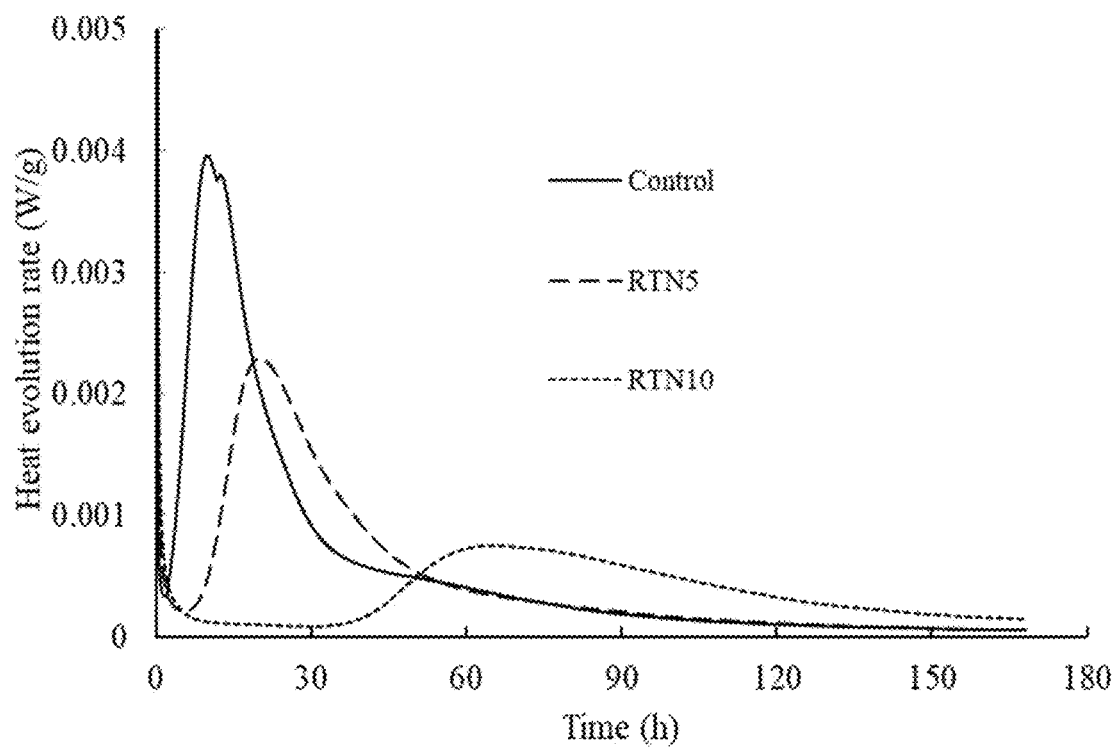

In this study, 5% and 10% hemp powders were used to replace cement, respectively. Since for cement pastes with any type of hemp powders, the effect of replacement content on cement hydration is similar, RTN incorporated cement pastes are taken as an example for analysis. The heat evolution and heat evolution rate of RTN incorporated cement paste with different replacement contents are shown in FIG. 5(a) and FIG. 5(b), respectively. It can be noted that compared to RTN5, the heat evolution and heat evolution rate of RTN10 is lower. Also, Table 6 and FIG. 4 show that with the increase of replacement content, the hydration time corresponding to the maximum peak of heat evolution rate curve increases, and the DoH value decreases. This is not only because higher replacement content can dilute cement and thus undoubtedly reduce the heat evolution, but also more hemp powders can be possibly decomposed to generate more saccharides in cement paste, inhibiting cement hydration.

The Effect of Treatment Method on Cement Hydration

Figure 6A:
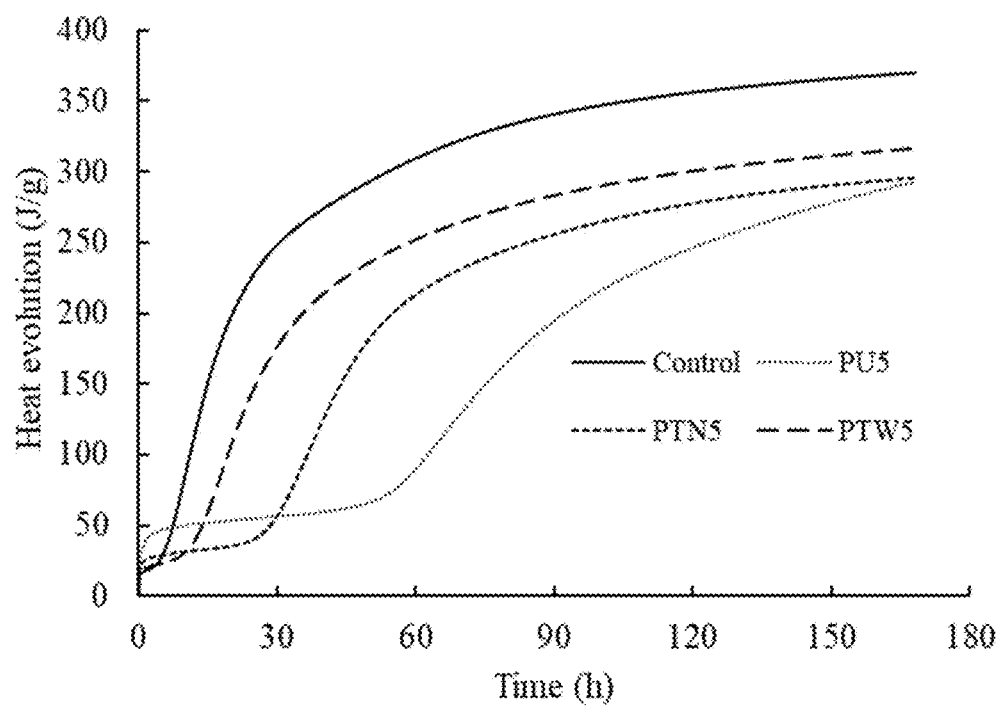
FIGS. 6A-B. (a) Heat evolution; and (b) heat evolution rate during hydration of portland cement paste with 5% fine hemp powders.
Figure 6B:
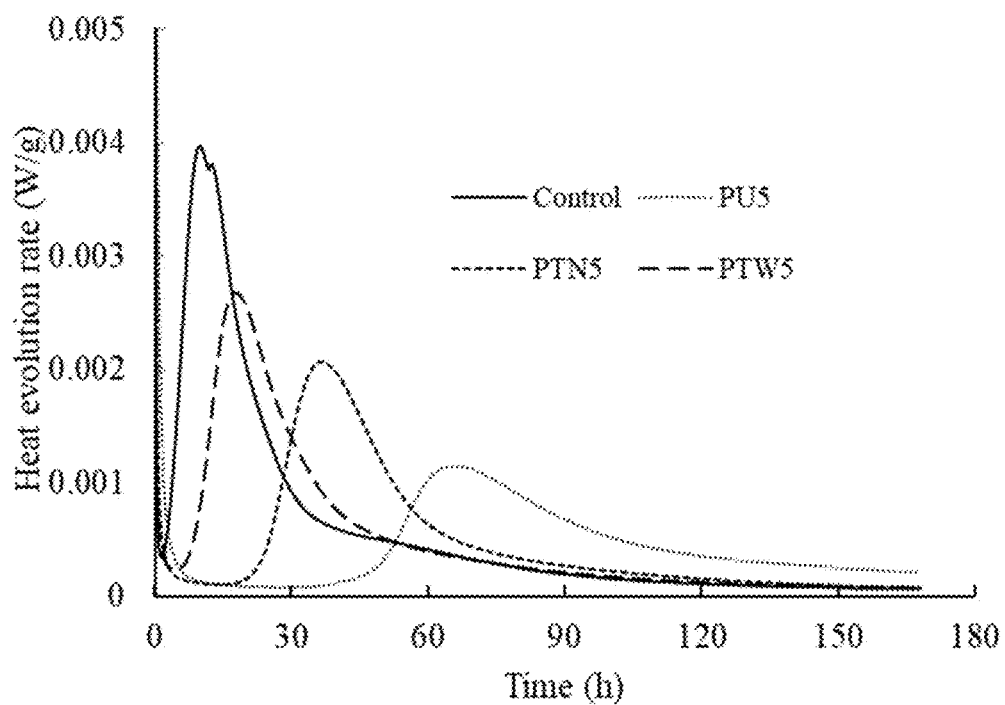

In this study, different treatment methods were applied to hemp powders. The cement pastes with 5% fine hemp powders are taken as an example for analysis. FIG. 6(a) and FIG. 6(b) plot the heat evolution and heat evolution rate of the pastes with 5% fine hemp powders, respectively. PTN5 and PTW5 both have higher heat evolution amount and heat evolution rate than those of PU5, and PTW5 has the highest amount among the three. Moreover, the hydration time corresponding to the maximum peak of the heat evolution rate curve is reduced, and the corresponding DoH value is improved, as shown in Table 6 and FIG. 4, respectively. This indicates that compared to untreated hemp powders (PU), the addition of treated hemp powders (PTN or PTW) to cement paste can mitigate the delay effect on the hydration of cement. The reason can be after calcium hydroxide treatment, much hemicellulose, lignin, and other extractives that can be decomposed into saccharides are removed from hemp powders (Lu and Oza 2011; Sawpan et al. 2011). This is also confirmed by the TGA test on hemp powders in this research. Compared to non-washed treated hemp powders (PTN), the washing process after chemical treatment can further mitigate the delay effect on the hydration of cement, resulting in a higher degree of hydration for washed treated hemp powders (PTW). This can be attributed to the further removal of hemicellulose during the washing process. This can also be due to the removal of some remaining saccharides during washing.

The Effect of Hemp Powder Size on Cement Hydration

Figure 7A:
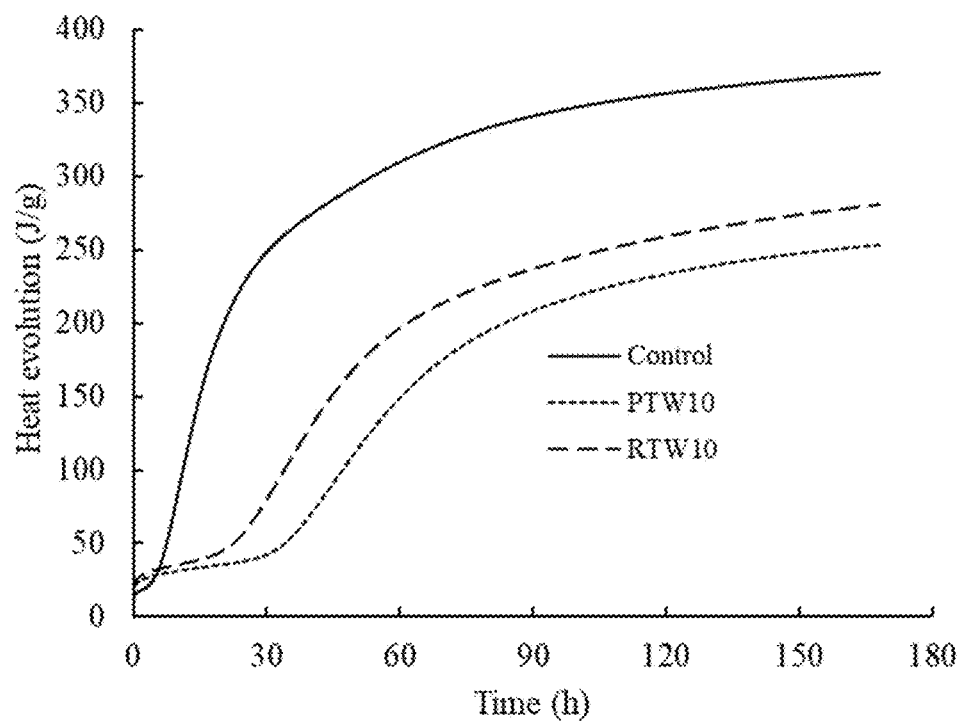
FIGS. 7A-B. (a) Heat evolution; and (b) heat evolution rate during hydration of portland cement paste with 10% washed treated hemp powders.
Figure 7B:
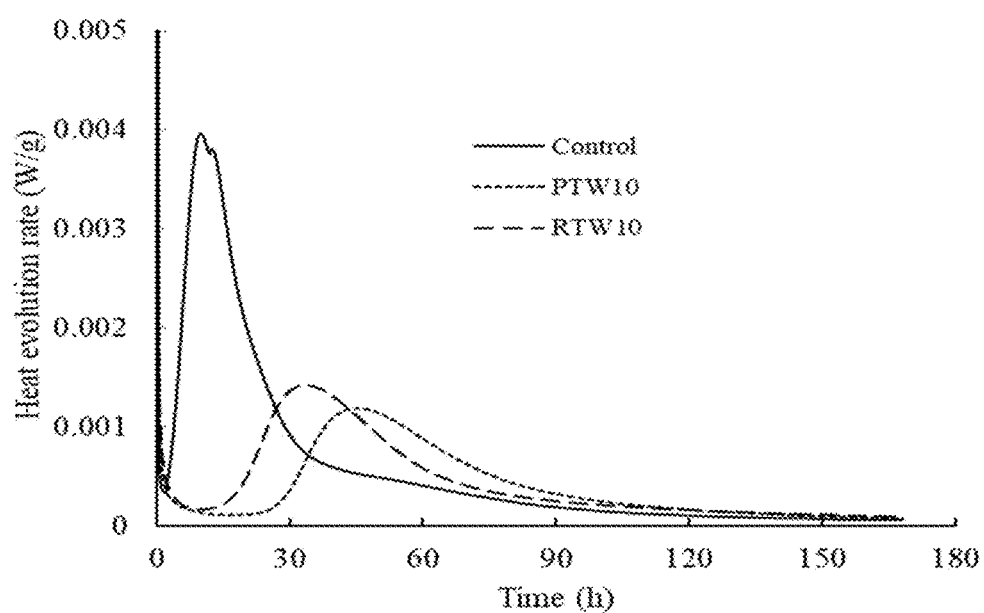

To study the size effect, cement pastes with 10% washed treated hemp powders are compared. The heat evolution and heat evolution rate of Portland cement paste with 10% washed treated hemp powders is shown in FIG. 7(a) and FIG. 7(b), respectively. It can be seen that compared to RTW10, PTW10 can lower the heat evolution amount and heat evolution rate. Moreover, Table 6 and FIG. 4 demonstrate that PTW10 has an increased hydration time corresponding to the maximum peak of the heat evolution rate curve and a lower DoH value, respectively. This indicates that the addition of fine hemp powders (PU, PTN, and PTW) can intensify the delay effect on the hydration of cement compared to coarse hemp powders (RU, RTN, and RTW). The possible reason may be that finer hemp powders (PU, PTN, and PTW) have higher specific surface area than coarse hemp powders (RU, RTN, and RTW), and they can be much easier to be dissipated in cement paste to produce saccharides, delaying the hydration of cement.

FTIR Analysis on Cement Pastes

Figure 8:
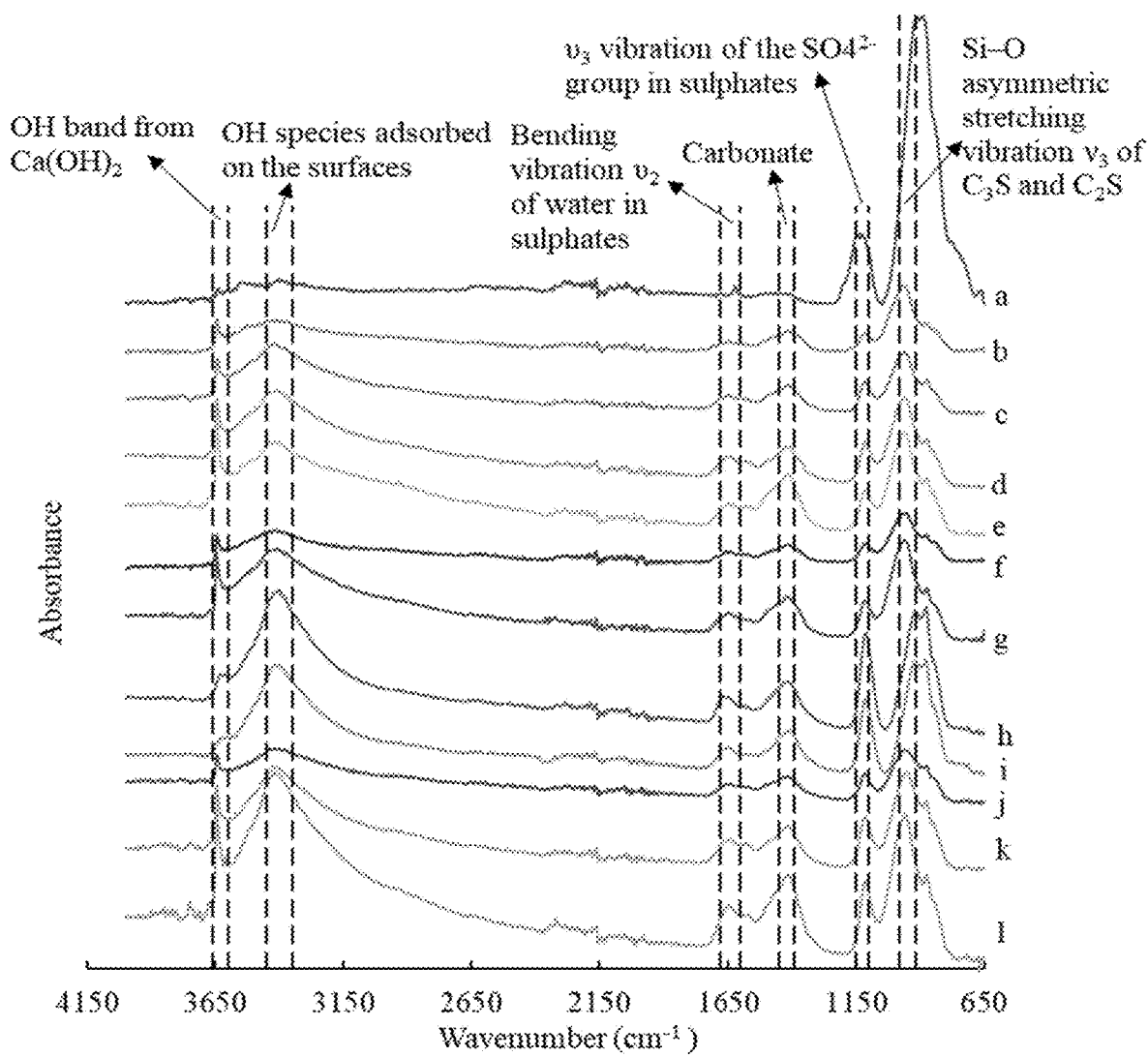
FIG. 8. FTIR spectra of (a) OPC; (b) control; (c) PU5; (d) PTN5; (e) PTW5; (f) RTN5; (g) RTW5; (h) PU10; (i) PTN10; (j) PTW10; (k) RTN10; and (1) RTW10.

The FTIR spectra of original Portland cement (OPC) and hydrated cement pastes at 7 days are shown in FIG. 8. There are four important regions that include water region (>1600 $cm^{-1}$), carbonate region (1400-1450 $cm^{-1}$), sulfate region (1100-1150 $cm^{-1}$), and silicate region (<1000 $cm^{-1}$) (Mollah et al. 2000). The FTIR spectral data of each region are shown in Table 7.

Water Region

From FIG. 8(a), it is shown that for OPC, there are no significant peaks in the water region. However, for all hydrated cement pastes (FIG. 8(b-1)), three important peaks appear in this region, and the corresponding spectral data are shown in Table 7. The first peak appears between 3612 and 3645 $cm^{-1}$, which corresponds to the OH band from $Ca(OH)_2$ (Mollah et al. 2000; Ylmén et al. 2009). This is attributed to the hydration of $C_3S$ and $C_2S$. The second peak appears between 3409 and 3435 $cm^{-1}$, which corresponds to hydrogen-bonded OH species (OH—OH) adsorbed on the surfaces (Mollah et al. 2000). This is due to the symmetric and asymmetric stretching vibration ($v_1$ and $v_3$) of $H_2O$ in the hydrated cement paste (Chakraborty et al. 2013a; Choudhary et al. 2015; Ylmén et al. 2009). The third peak appears between 1641 and 1670 cm$^{-1}$, which may be attributed to the bending vibration $v_2$ of water in sulphates, mainly gypsum (Ylmén et al. 2009).

Carbonate Region

For OPC, FIG. 8(a) does not show any significant peaks in the carbonate region. However, for all hydrated cement pastes (FIG. 8(b-1)), a peak between 1416 and 1425 appears, which is due to the reaction of atmospheric $CO_2$ with the calcium hydroxide produced by cement hydration (Liu and Sun 2013).

Sulfate Region

The sulfates present in OPC are gypsum ($CaSO_4.2H_2O$), hemihydrate ($CaSO_4.0.5H_2O$) and anhydrite ($CaSO_4$), and the sulfate region in FTIR spectrum is located between 1100-1150 cm$^{-1}$, corresponding to the $v_3$ vibration of the $SO_4^{2-}$ group in sulphates (Choudhary et al. 2015; Ylmén et al. 2009). FIG. 8(a) shows that two peaks (1143 cm$^{-1}$ and 1126 cm$^{-1}$ listed in Table 7) appear in the sulfate region of OPC, which may be because different forms of sulfates lead to different peaks. Upon hydration, these two peaks become one peak that is between 1114 and 1120 cm$^{-1}$ for all hydrated cement pastes, as shown in FIG. 8(b-1) and Table 7. The shift of sulfate band towards a lower wavenumber is due to the formation of ettringite (Mollah et al. 2000).

Silicate Region

FIG. 8(a) shows that OPC has a significant peak at 917 cm$^{-1}$ in the silicate region, which is due to Si—O asymmetric stretching vibration ($v_3$) of $C_3S$ and C25 phase (Choudhary et al. 2015). For hydrated cement pastes (except for PU10 and PTN110), this peak significantly shifts towards a higher wavenumber that is between 954 and 965 cm$^{-1}$ as shown in Table 7. The shifting of the Si—O stretching vibration is indicative of the polymerization of silicate units ($SiO_4^{2-}$), with the formation of C-S-H phase as a result of cement hydration (Govin et al. 2006; Mollah et al. 2000; Peschard et al. 2004). However, FIG. 8(h) shows the silicate peak of PU10 does not shift and FIG. 8(i) shows the peak of PTN10 only shifts 6 cm$^{-1}$, which may be because the degree of hydration for these two samples is so low that very few C-S-H is formed. This is confirmed by IC and TGA tests that PU10 and PTN10 are still in the dormant period after 7 days.

TABLE 7

FTIR spectral data for original portland cement and hydrated cement pastes

| Samples | Water region | | | Carbonate region | Sulfate region | Silicate region |
|---|---|---|---|---|---|---|
| | Peak 1 | Peak 2 | Peak 3 | Peak 1 | Peak 1 | Peak 1 |
| OPC | — | — | — | — | 1143 & 1126 | 917 |
| Control | 3644 | 3419 | 1641 | 1424 | 1118 | 962 |
| PU5 | 3643 | 3422 | 1650 | 1420 | 1119 | 961 |
| PTN5 | 3644 | 3419 | 1648 | 1424 | 1117 | 960 |
| PTW5 | 3644 | 3419 | 1658 | 1420 | 1120 | 965 |
| RTN5 | 3644 | 3427 | 1657 | 1425 | 1115 | 961 |
| RTW5 | 3645 | 3418 | 1649 | 1420 | 1118 | 964 |
| PU10 | 3626 | 3409 | 1670 | 1424 | 1114 | 917 |
| PTN10 | 3612 | 3414 | 1653 | 1419 | 1114 | 923 |
| PTW10 | 3645 | 3435 | 1655 | 1422 | 1115 | 964 |
| RTN10 | 3645 | 3423 | 1650 | 1421 | 1114 | 954 |
| RTW10 | 3645 | 3419 | 1643 | 1416 | 1114 | 959 |

Note:
M-dashes indicate no peak.

Microstructure

Figure 9A:
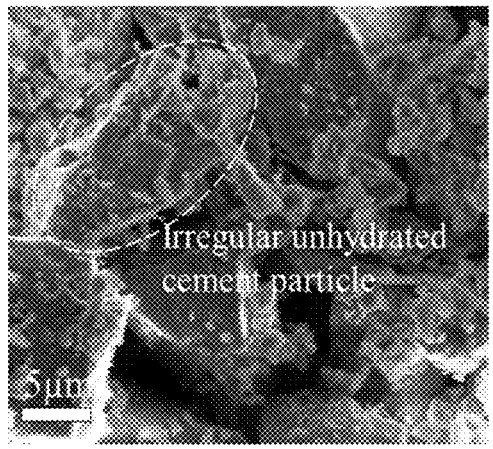
FIGS. 9A-E. Microstructure of (a) unhydrated cement powder; (b) control; (c) PU10; (d) PTN10; and (e) PTW10.
Figure 9B:
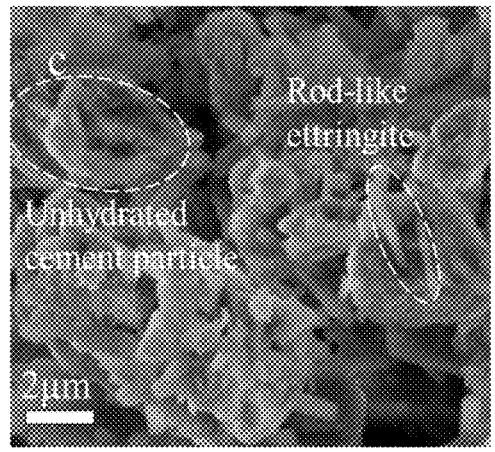
Figure 9C:
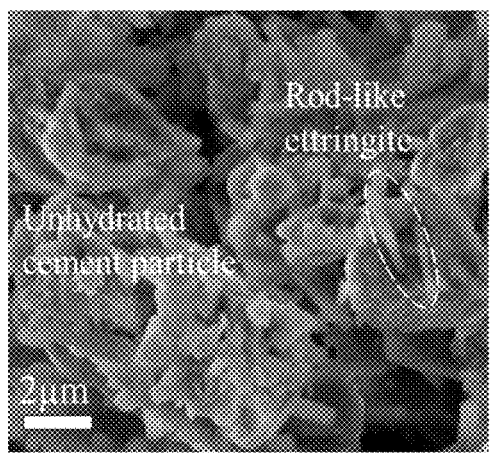
Figure 9D:
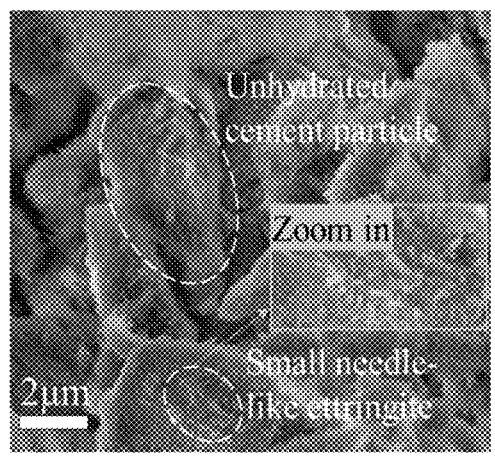
Figure 9E:
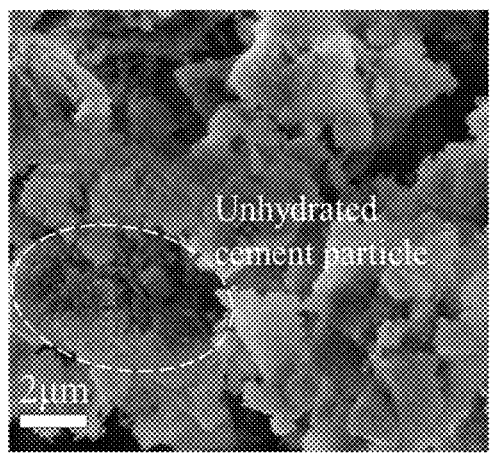

In order to examine the effect of untreated and chemically treated hemp powders on the microstructure of cement paste, the control, PU10, PTN10, and PTW10 samples at 7 days are taken as an example for analysis. In addition, the SEM image on unhydrated cement powders is also adopted to assist analysis. For unhydrated cement powders, some large irregular particles can be clearly seen, as shown in FIG. 9 (a). For the control cement paste, FIG. 9(b) shows that some needle-like ettringites and C-S-H are formed after cement hydration. For PU10, some large unhydrated cement particles and rod-like ettringites can be seen in FIG. 9(c). This could be due to large amounts of decomposition products (most possibly much saccharides) of untreated hemp powders delaying the hydration of cement, as confirmed by TGA and IC tests in this study. Moreover, the seriously delayed cement hydration prevent the further development of rod-like ettringites into needle-like ettringites. It has been reported that at a very early stage, ettringites are formed as hexagonal rods, and the relatively slender ettringites can be observed with the hydration progress (Liu 2014). Also, Cody et al. reported that the presence of sugars can lead to the morphology of ettringites to be short thick hexagonal prisms rather than needles (Cody et al. 2001). For PTN10, many unhydrated cement particles are clearly shown in FIG. 9(d). Compared to PU10, PTN10 has some small needle-like ettringites instead of rod-like ettringites on the surface, which indicates that some needle-like ettringites start to form. The reason may be chemically treated hemp powders have fewer saccharides inside, which makes the hydration of cement less delayed. For PTW10, although a small quantity of unhydrated cement particles can still be identified, they are not obvious in FIG. 9(e). Compared to PU10 and PTN10, more hydration products are formed, and the hydration of PTW10 seems to be the least delayed.

CONCLUSIONS

In this research, untreated and calcium hydroxide treated hemp powders were used to partially replace cement. Compared to pure cement paste, IC test shows that the incorporation of hemp powders in cement paste can reduce heat evolution amount and slow down heat evolution rate; also, the degree of hydration (DoH) calculated based on TGA test matches the IC results. This confirms the delayed effects of hemp powders on cement hydration. SEM analysis shows that the formation of hydration products are significantly influenced if hemp powders are involved.

The research also shows that the 10% replacement content delays the hydration of cement significantly. Particularly, for PU10 (untreated fine powders) and PTN10 (treated but non-washed fine powders) samples, the hydration is almost completely inhibited, and the degree of hydration is significantly low compared to others (e.g. 5% replacement). This indicates that 10% is the limit replacement if hemp powders are used.

Compared to the pastes with untreated hemp powders, treated hemp powders can reduce the delay effect when used. Also, the washed treated hemp powders had the minimum delay effect on cement hydration. The reduced delay effect may be attributed to the fact that much hemicellulose is removed after calcium hydroxide treatment and washing process, as confirmed by TGA test in this study.

In addition, the study also shows that fine hemp powders can delay the hydration of cement paste more than coarse hemp powders, which can be attributed to the higher specific surface area of fine hemp powders that can be easily decomposed into saccharides to delay the hydration of cement.

Generally, regardless of replacement content, treatment method, and hemp powder size, the delaying effect of hemp powders on cement hydration is clear, which can reduce the mechanical properties of cementitious materials significantly. However, hemp powders can be useful in serving as powder-type retardation agents to adjust cement hydration rate as needed, particularly in some extreme occasions where rapid hydration needs to be avoided.

REFERENCES

Adesanya, D., and Raheem, A. (2009). "Development of corn cob ash blended cement." *Construction and Building Materials*, 23(1), 347-352.

ASTM. (2009). "Standard test method for measurement of heat of hydration of hydraulic cementitious materials using isothermal conduction calorimetry." ASTM C1702-09a, West conshohocken, PA.

Bilba, K., Arsène, M.-A., and Ouensanga, A. (2003). "Sugar cane bagasse fibre reinforced cement composites. Part I. Influence of the botanical components of bagasse on the setting of bagasse/cement composite." *Cement and concrete composites*, 25(1), 91-96.

Cao, Y., Zavaterri, P., Youngblood, J., Moon, R., and Weiss, J. (2015). "The influence of cellulose nanocrystal additions on the performance of cement paste." *Cement and Concrete Composites*, 56, 73-83.

Chakraborty, S., Kundu, S. P., Roy, A., Adhikari, B., and Majumder, S. B. (2013a). "Effect of jute as fiber reinforcement controlling the hydration characteristics of cement matrix." *Industrial & Engineering Chemistry Research*, 52(3), 1252-1260.

Chakraborty, S., Kundu, S. P., Roy, A., Basak, R. K., Adhikari, B., and Majumder, S. (2013b). "Improvement of the mechanical properties of jute fibre reinforced cement mortar: A statistical approach." *Construction and Building Materials*, 38, 776-784.

Choudhary, H., Anupama, A., Kumar, R., Panzi, M., Matteppanavar, S., Sherikar, B. N., and Sahoo, B. (2015). "Observation of phase transformations in cement during hydration." *Construction and Building Materials*, 101, 122-129.

Cody, R. D., Cody, A. M., Spry, P. G., and Lee, H. (2001). "Reduction of concrete deterioration by ettringite using crystal growth inhibition techniques." Department of Geological and Atmospheric Sciences, Iowa State University.

Dewi, S. M., and Wijaya, M. N. "The use of bamboo fiber in reinforced concrete beam to reduce crack." *Proc., AIP Conference Proceedings*, AIP Publishing, 020003.

Elmer, P. (2005). "FT-IR Spectroscopy Attenuated Total Reflectance (ATR)." *Technical note*, 27(11).

Feng, X., Garboczi, E. J., Bentz, D. P., Stutzman, P. E., and Mason, T. O. (2004). "Estimation of the degree of hydration of blended cement pastes by a scanning electron microscope point-counting procedure." *Cement and concrete research*, 34(10), 1787-1793.

Govin, A., Peschard, A., and Guyonnet, R. (2006). "Modification of cement hydration at early ages by natural and heated wood." *Cement and concrete composites*, 28(1), 12-20.

Guerra, M. I., Mordf, J., Garcia, J., and Rodriguez, D. (2012). "Testing concrete made with cork powder and steel fibres." *Scientific Research and Essays*, 7(46), 3974-3982.

Guo, A., Aamiri, O. B., Satyavolu, J., and Sun, Z. (2019). "Impact of thermally modified wood on mechanical properties of mortar." *Construction and Building Materials*, 208, 413-420.

Habeeb, G. A., and Mahmud, H. B. (2010). "Study on properties of rice husk ash and its use as cement replacement material." *Materials research*, 13(2), 185-190.

Horgnies, M., Chen, J., and Bouillon, C. (2013). "Overview about the use of Fourier transform infrared spectroscopy to study cementitious materials." *WIT Trans. Eng. Sci*, 77, 251-262.

Jo, B.-W., and Chakraborty, S. (2015). "A mild alkali treated jute fibre controlling the hydration behaviour of greener cement paste." *Scientific reports*, 5, 7837.

John, M. J., and Anandjiwala, R. D. (2008). "Recent developments in chemical modification and characterization of natural fiber-reinforced composites." *Polymer composites*, 29(2), 187-207.

John, M. J., and Thomas, S. (2008). "Biofibres and biocomposites." *Carbohydrate polymers*, 71(3), 343-364.

Karim, M. R., Hossain, M. M., and Yusoff, S. B. "Engineering and sustainability aspect of palm oil shell powder in cement." Proc., AIP Conference Proceedings, AIP Publishing, 020038.

Kochova, K., Schollbach, K., Gauvin, F., and Brouwers, H. (2017). "Effect of saccharides on the hydration of ordinary Portland cement." *Construction and Building Materials*, 150, 268-275.

Li, Z., Wang, L., and Wang, X. (2004). "Compressive and flexural properties of hemp fiber reinforced concrete." *Fibers and Polymers*, 5(3), 187-197.

Liu, F. (2014). "Early-age hydration studies of Portland cement."

Liu, F., and Sun, Z. (2013). "Feasibility study of using Raman spectroscopy to detect hydration in wet pastes." *ACI Materials Journal*, 110(6), 611.

Lu, N., and Oza, S. "Effect of Physical and Chemical Surface Treatment on the Thermal Stability of Hemp Fibers as Reinforcement in Composite Structures." *Proc., Applied Mechanics and Materials*, Trans Tech Publ, 616-620.

Lv, G.-j., Wu, S.-b., and Lou, R. (2010). "Kinetic study for the thermal decomposition of hemicellulose isolated from corn stalk." *BioResources*, 5(2), 1281-1291.

Matos, A. M., Nunes, S., and Sousa-Coutinho, J. (2015). "Cork waste in cement based materials." *Materials & Design*, 85, 230-239.

Mollah, M., Yu, W., Schennach, R., and Cocke, D. L. (2000). "A Fourier transform infrared spectroscopic investigation of the early hydration of Portland cement and the influence of sodium lignosulfonate." *Cement and concrete research*, 30(2), 267-273.

Pane, I., and Hansen, W. (2005). "Investigation of blended cement hydration by isothermal calorimetry and thermal analysis." *Cement and concrete research*, 35(6), 1155-1164.

Peschard, A., Govin, A., Grosseau, P., Guilhot, B., and Guyonnet, R. (2004). "Effect of polysaccharides on the hydration of cement paste at early ages." *Cement and Concrete Research*, 34(11), 2153-2158.

Quiroga, A., Marzocchi, V., and Rintoul, I. (2016). "Influence of wood treatments on mechanical properties of wood-cement composites and of Populus Euroamericana wood fibers." *Composites Part B: Engineering,* 84, 25-32.

Sakr, K. (2006). "Effects of silica fume and rice husk ash on the properties of heavy weight concrete." *Journal of materials in civil engineering,* 18(3), 367-376.

Sawpan, M. A., Pickering, K. L., and Fernyhough, A. (2011). "Effect of various chemical treatments on the fibre structure and tensile properties of industrial hemp fibres." *Composites Part A: Applied Science and Manufacturing,* 42(8), 888-895.

Shang, H., and Sun, Z. (2019). "PAHs (naphthalene) removal from stormwater runoff by organoclay amended pervious concrete." *Construction and Building Materials,* 200, 170-180.

Smith, B. J., Rawal, A., Funkhouser, G. P., Roberts, L. R., Gupta, V., Israelachvili, J. N., and Chmelka, B. F. (2011). "Origins of saccharide-dependent hydration at aluminate, silicate, and aluminosilicate surfaces." *Proceedings of the National Academy of Sciences,* 108(22), 8949-8954.

Sun, Z., Liu, F., Tong, T., Qi, C., and Yu, Q. (2017). "Hydration of Concrete Containing Hybrid Recycled Demolition Powders." *Journal of Materials in Civil Engineering,* 29(7), 04017037.

Tay, J.-H. (1990). "Ash from oil-palm waste as a concrete material." *Journal of Materials in Civil Engineering,* 2(2), 94-105.

Vaickelionis, G., and Vaickelioniene, R. (2006). "Cement hydration in the presence of wood extractives and pozzolan mineral additives." *Ceramics Silikaty,* 50(2), 115.

Wang, S., Lin, H., Zhang, L., Dai, G., Zhao, Y., Wang, X., and Ru, B. (2016). "Structural characterization and pyrolysis behavior of cellulose and hemicellulose isolated from softwood Pinus armandii Franch." *Energy & Fuels,* 30(7), 5721-5728.

Wei, J., and Meyer, C. (2014). "Improving degradation resistance of sisal fiber in concrete through fiber surface treatment." *Applied Surface Science,* 289, 511-523.

Xie, X., Gou, G., Wei, X., Zhou, Z., Jiang, M., Xu, X., Wang, Z., and Hui, D. (2016). "Influence of pretreatment of rice straw on hydration of straw fiber filled cement based composites." *Construction and Building Materials,* 113, 449-455.

Yang, H., Yan, R., Chen, H., Lee, D. H., and Zheng, C. (2007). "Characteristics of hemicellulose, cellulose and lignin pyrolysis." *Fuel,* 86(12), 1781-1788.

Ylmén, R., Jäglid, U., Steenari, B.-M., and Panas, I. (2009). "Early hydration and setting of Portland cement monitored by IR, SEM and Vicat techniques." *Cement and Concrete Research,* 39(5), 433-439.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A concrete mixture, comprising:
cement powder;
a plant biomaterial in a solid form, wherein the plant biomaterial does not comprise ash and wherein the plant biomaterial has been treated with an alkaline extraction agent and washed with water after treatment with the alkaline extraction agent; and
concrete aggregate,
wherein a ratio of cement powder to the biomaterial ranges from 10:1 to 100:1.

2. The concrete mixture of claim 1, wherein the ratio of cement powder to the plant biomaterial ranges from 10:1 to 25:1.

3. The concrete mixture of claim 1, wherein the plant biomaterial is obtained from a plant selected from the group consisting of hemp, kenaf, and combinations thereof.

4. The concrete mixture of claim 1, wherein the plant biomaterial is obtained from a plant part selected from the group consisting of a stalk, stem, flowering material, hurd, bast, and combinations thereof.

5. The concrete mixture of claim 1, wherein the solid form is selected from the group consisting of powder, chips, fibers, and nanoparticles.

6. The concrete mixture of claim 1, wherein the mixture further comprises one or more materials selected from siliceous or calcareous fly ash, slag cement, and silica fume.

7. The concrete mixture of claim 1, further comprising at least a portion of the alkaline extraction agent used to treat the plant biomaterial.

8. The concrete mixture of claim 1, further comprising at least a portion of the water used to wash the plant biomaterial.

9. A method of controlling concrete setting, comprising adding a plant biomaterial in a solid form to a concrete mixture, wherein the plant biomaterial does not comprise ash and wherein the plant biomaterial is treated with an alkaline extraction agent prior to being added to the concrete mixture and washed with water after being treated with the alkaline extraction agent.

10. The method of claim 9, wherein a ratio of cement powder to the biomaterial ranges from 10:1 to 100:1.

11. The method of claim 9, wherein the plant biomaterial is obtained from a plant selected from the group consisting of hemp, kenaf, and combinations thereof.

12. The method of claim 9, wherein the plant biomaterial is obtained from a plant part selected from the group consisting of a stalk, stem, flowering material, hurd, bast, and combinations thereof.

13. The method of claim 9, wherein the solid form is selected from the group consisting of powder, chips, fibers, and nanoparticles.

14. The method of claim 9, further comprising adding one or more materials selected from siliceous or calcareous fly ash, slag cement, and silica fume.

15. The method of claim 9, wherein at least a portion of the alkaline extraction agent used to treat the plant biomaterial is added to the concrete mixture.

16. The method of claim 9, wherein at least a portion of the water used to wash the plant biomaterial is added to the concrete mixture.

* * * * *